United States Patent Office 3,526,838
Patented Sept. 1, 1970

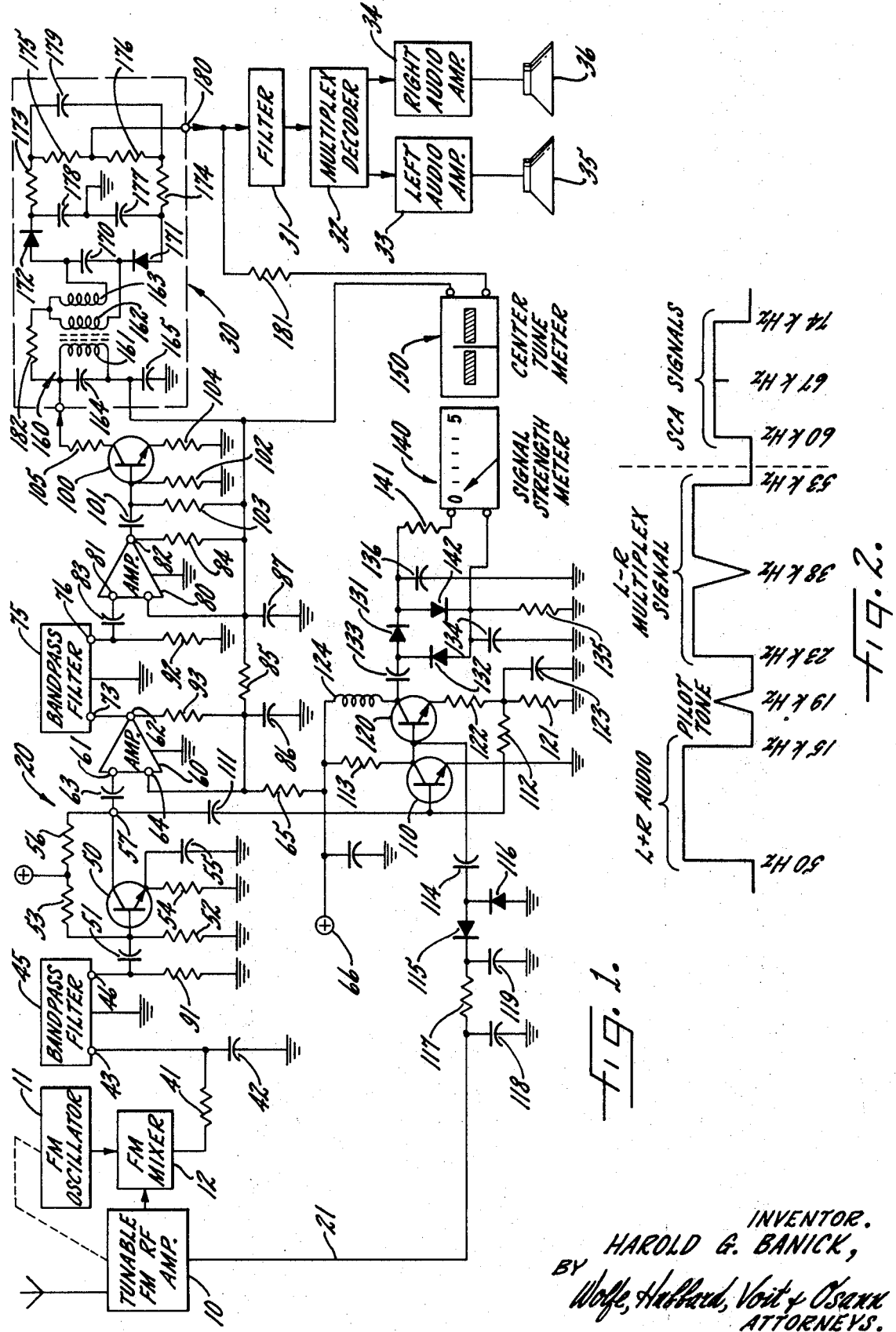

3,526,838
TUNING INDICATOR SYSTEM FOR
FM RECEIVER
Harold G. Banick, Eau Claire, Mich., assignor to Heath
Company, St. Joseph, Mich., a corporation of Delaware
Filed Dec. 20, 1967, Ser. No. 692,121
Int. Cl. H04b 1/08
U.S. Cl. 325—455                           2 Claims

ABSTRACT OF THE DISCLOSURE

A tuning indicator for an FM receiver in which the functions of a signal strength meter and tuning meter, referred to as a center tune meter, are integrated in such a way as to facilitate tuning. The disclosure includes improved circuitry for energizing the meters.

---

It has been known in the past to provide a signal strength meter in receivers of various kinds, usually energized directly from the automatic gain control, or A.G.C. line. It has also been known to provide a meter at the output of a ratio detector in an FM receiver and which is actuated by the direct voltage component of the output.

It is an object of the present invention to provide an FM stereo receiver in which the functions of a signal meter and center tune meter are integrated in a novel way to enable the user of the receiver to tune a signal quickly, conveniently, and with assurance, even with the speaker system silenced. It is another object of the invention to provide an FM receiver having a signal meter and center tune meter which avoids the condition of ambiguity which arises when such meters are separately used. It is a related object to provide a tuning indicator system which is particularly applicable for use with an I.F. amplifier having crystal filters and characterized by a flat, well defined pass band and which insures that the incoming signal is tuned to the center of the pass band. It is another related object to provide an FM receiver in which the signal meter and center tune meter are arranged in such a way that all of the information required for precise tuning and evaluation of the signal can be observed at a glance, the two readings merging, in effect, into a single coordinated observation.

It is one of the more detailed objects of the present invention to provide circuitry for actuating the signal meter which produces a highly sensitive reading on weak stations and which has provision for compressing the reading at the upper end of the scale for stations of large signal strength to prevent a condition of overload. Similarly it is an object to provide a modified circuit for energizing the center tune meter from a ratio type detector to provide a clearly defined null combined with good stage linearity.

Other objects and advantages of the invention will become apparent upon reading the attached detailed description and upon reference to the drawing in which:

FIG. 1 comprises a circuit diagram, partly in block form, of an FM stereo receiver including an improved tuning indicator constructed in accordance with the present invention;

FIG. 2 is a diagram showing the components of a typical transmitted FM signal.

While the invention has been described in connection with a preferred embodiment, it will be understood that I do not intend to be limited to the particular embodiment but intend to cove the various alternative and equivalent forms of the invention included within the spirit and scope of the appended claims.

Turning now to the drawings, FIG. 1 shows a receiver circuit embodying the invention while FIG. 2 shows the components normally found in a transmitted FM stereo signal. The "L+R," or "left plus right," component which is in the audio spectrum (50 Hz. to 15 kHz.) is the portion of the signal utilized by monophonic FM receivers. Above the audio range and extending on each side of a center frequency of 38 kHz. is a multiplex "L—R" signal in the form of a suppressed carrier, amplitude-modulated by the difference between the left and right-hand audio channels, interposed between the audio and multiplex signals is a pilot signal at a frequency of 19 kHz. which is used as a phasing reference in decoding the multiplex signal and in controlling a switch to switch the receiver to the monophonic mode. At the top end of the spectrum are optionally transmitted signals referred to as "SCA" which are filtered out and not utilized in the present receiver.

In FIG. 1 portions of the circuit are shown in detail while other portions, known to those skilled in the art, or susceptible to cross referencing, have been shown, for the sake of simplicty, in block form. The receiver has a tunable R.F. amplifier 10 arranged for connection to a suitable antenna. The signal from the R.F. amplifier is mixed with that from a tunable FM oscillator 11 in an FM mixer 12 to produce an output signal having a center frequency at the standard value of 10.7 mHz. Such signal is amplified in the I.F. amplifier generally indicated at 20 which, in addition to its amplification function, provides an automatic gain control signal on A.G.C. line 21. The output of the I.F. amplifier is fed to a ratio detector 30. After passing through a filter 31 to remove the SCA components, the signal is passed to a multiplex decoder 32. The latter serves to separate the signal into its left and right components which are separately amplified by amplifiers 33, 34 connected respectively to loudspeakers 35, 36, as discussed in Brahman Ser. No. 683,725, filed Nov. 16, 1967, for Phase Adjusting Arrangement for FM Stereo Receiver.

In carrying out the present invention the I.F. amplifier 20 includes a plurality of wide band amplifier stages with means for limiting the output and a plurality of bandpass crystal filter stages centered at a frequency of 10.7 mHz., with the amplifier and filter stages being connected alternately in sequence with one another. Thus, referring to the drawings, the I.F. amplifier has an input resistor 41, and an impedance matching capacitor 42, connected to the input terminal 43 of a crystal bandpass filter 45 having an output terminal 46. The filter is preferably one having a characteristic which is flat over the pass band with a center frequency of 10.7 mHz. but which drops sharply on each side of the pass band in accordance with the following table:

| Bandwidth (kHz.): | Db down |
|---|---|
| 160 | 0 |
| 200 | 1.5 |
| 240 | 3 |
| 500 | 20 |
| 1100 | 50 |

The filter should have good phase linearity, maintaining linearity to within plus or minus 3% or better measured as deviation from the best straight line over the 200 kHz. width of the pass band. While the filter circuit may be any circuit capable of producing similar bandpass characteristic, I prefer to employ a Butterworth circuit having two piezo-electric crystals as set forth in my co-pending application Ser. No. 690,939, filed Dec. 15, 1967, for I.F. Amplifier for FM Receiver. Connected to the output terminal of the bandpass filter I prefer to use an auxiliary stage of amplification formed of a transistor 50 in which the base is fed by an input capacitor 51, with bias being determined by a resistor network 52, 53. In series with the emitter terminal is an emitter resistor 54 bypassed by a capacitor 55. The collector is fed through an output resistor 56 which is connected to a terminal 57 which is the output terminal for the stage. This transistor stage is provided primarily to feed laterally-connected circuitry to be described.

From the terminal 57 the signal passes into a high gain, wide band amplifier 60 having an input terminal 61 and an output terminal 62, a capacitor 63 being imposed ahead of the input terminal. For the details of the wide band amplifier, reference is made to co-pending application Ser. No. 690,939. It will suffice for the present to say that the amplifier stage is characterized by a high degree of linearity, capable of limiting action with a signal of 600 microvolts to the input terminal, and with a maximum output swing of about ½ volt. The input impedance is preferably on the order of 2900 ohms and the nominal output impedance is preferably about 40K ohms. The gain within the stage is preferably about 61 db at 10.7 mHz. Positive voltage is supplied to the amplifier by a terminal 64 through a resistor 65 which is connected to a positive bus 66.

Coupled to the output of the amplifier 60 is the input terminal 73 of the bandpass filter 75 having an output terminal 76, the filter being preferably identical to the filter 45 previously mentioned. The output signal from the filter is fed to a second wide band amplifier 80 having an input terminal 81 and an output terminal 82 with a coupling capacitor 83 on the input side and having an output resistor 84. The amplifier 80 is preferably identical to the amplifier 60. Direct voltage for the amplifier is obtained from the positive bus 66 via a decoupling network consisting of resistor 85 and capacitors 86, 87. Since the filters are preferably designed for a source and load impedance which is relatively low, on the order of 500 ohms, matching resistors having a relatively low resistance on the order of 620 ohms, indicated at 91, 92, are connected in shunt with the filter output terminals. Similarly a resistor 93 having a relatively low value on the order of 510 ohms is used at the input of the filter 75.

Because the voltage at the output of the amplifier 80 is limited, an additional stage of amplification is used consisting of a transistor 100 having an input capacitor 101 and an input resistor network consisting of resistors 102, 103. A resistor 104 is connected in series with the emitter. Coupling to the ratio detector takes place through a collector output resistor 105.

In carrying out the present invention, means are provided for sampling the signal and deriving A.G.C. and signal strength voltages at a point in the I.F. amplifier ahead of the amplifying units 60, 80 in which limiting takes place. Thus referring to FIG. 1, a transistor amplifier 110 is provided having an input capacitor 111 connected to the output of the amplifier stage 50 and having a base resistor 112 and a collector or output resistor 113. The amplified signal, taken from the collector is passed through a coupling capacitor 114 and rectified by a voltage doubling diode rectifier 115, 116. Prior to being fed to the A.G.C. line 21, the signal is filtered by resistor 117 and capacitors 118, 119. Preferably the diodes 115, 116 are of the germanium type having a forward voltage drop so that substantially no A.G.C. voltage is produced at low signal levels, this being referred to as "delayed" A.G.C.

In accordance with the invention a signal strength meter is provided for indicating the level of signal strength ahead of the limiting portion of the I.F. amplifier, driven via a separate meter amplifier which is independent of the A.G.C. line and which is therefore not subject to the "delay" which occurs in that line. Use of a separate meter amplifier achieves a high degree of sensitivity at low signal levels, with means being provided to shunt the signal automatically at high signal levels to prevent overloading of the meter. Thus, referring to the drawing, an amplifying transistor 120 is provided having its base terminal directly connected to the output of the transistor 110. Resistors 121, 122 are used in the emitter circuit, the resistor 121 being bypassed by capacitor 123. Voltage is supplied to the collector terminal via an inductor 124 providing high frequency isolation. To rectify the signal voltage for the meter, a voltage doubling half wave rectifier is provided consisting of diodes 131, 132 which are coupled to the collector of the transistor via a coupling capacitor 133. The rectified output voltage is filtered by a capacitor 134 shunted by a resistor 135 and by an output capacitor 136. The meter, indicated at 140, preferably is such as to provide a full scale indication with 150 microamperes of current. A series resistor 141 is preferably so chosen as to give approximately ⅔ full scale indication with a signal on the order of 1000 microvolts at the antenna of the receiver. Protection of the meter at higher signal levels and effective compression of the upper end of the meter scale is provided by a shunting diode 142. Such diode preferably is of the germanium type having a forward voltage drop which varies with the magnitude of the applied voltage.

In practicing the present invention a center tune meter is provided, responsive to the direct output voltage from the ratio detector, and located immediately adjacent the signal strength meter for simultaneous and coordinating viewing as the set is tuned. As shown in the drawing the center tune meter, indicated at 150, is preferably placed just to the right of the signal strength meter 140 so that the swing of the pointer, or indicator, on the latter carries the eye in the direction of the center tune meter, the pointer of which is centered to provide indication of final and precise tuning.

To understand the circuit employed for driving the center tune meter, more detailed reference will be made to the ratio detector 30. Such ratio detector includes a transformer 160 having a primary winding 161 and bifilar secondary windings 162, 163. The transformer is resonated at the I.F. center frequency of 10.7 mHz. by a capacitor 164 which shunts the primary winding. One end of the primary winding is connected, via resistor 105, to the collector of the transistor 100 while the other is connected to the positive voltage bus shunted by a capacitor 165.

The secondary output terminals, shunted by capacitor 170, are connected to a balanced circuit including diodes 171, 172 and series resistors 173, 174 and 175, 176. The input ends of resistors 173, 174 are shunted to ground by low value capacitors 177, 178 while the resistors 175, 176 are shunted by a large capacitance 179. An output terminal 180 connected to the junction of resistors 175, 176 conducts the detected FM signal to the filter 31 where the unused high frequency components are removed prior to decoding. Leading from the terminal 180 is a series resistor 181 which is connected to one side of the meter 150.

In carrying out the invention the primary and secondary windings of the transformer 160 are connected together by an auxiliary resistor 182 for the purpose of improving the linearity of the circuit. This places positive voltage on both of the secondary windings, and to avoid the effect of this voltage the meter circuit, instead of being grounded, is completed by connecting it to the voltage source.

Thus, in operation, the voltages which are respectively induced in the secondary windings create two current loops. The first is via diode 171, resistors 174, 176, resistor 181 and through the meter 150. From the meter the circuit is completed via the primary winding 161 and auxiliary resistor 182 to the common connection of the transformer secondary. The second loop includes the diode 172 and resistors 173, 175 with completion through the same meter circuit. At the I.F. center frequency of 10.7 mHz., the two currents are of equal magnitude, cancelling each other. However when the I.F. frequency deviates from the center frequency due to the FM modulation, the current in one loop increases while the current in the other decreases, with the resulting fluctations in output voltage forming the output signal. When the signal is not in tune so that the center frequency of the I.F. signal is either higher or lower than the 10.7 mHz. resonant frequency of the detector, corresponding to the center of the I.F. pass band, a gross unbalance occurs in the detector output circuit causing the pointer of the meter 150 to occupy a position either to the left or right of center. The circuit is preferably phased so that the motion of the hand on the tuning dial corresponds to the direction of movement of the indicating pointer as it is moved to center position for precise tuning.

It is found that the two meters, 140, 150, arranged side-by-side, supplement one another in conveying to the user of the receiver the information which he needs for proper tuning, particularly where the signal utilized for the signal strength meter is taken from a point in the I.F. amplifier characterized by a flat, steeply skirted pass band. In the present instance the signal is taken from point 57 which follows the bandpass filter 45 and non-limited amplifier 50. Under such circumstances the signal strength meter does not evidence a well defined peak but suffices simply to tune the signal to the plateau of the pass band. Once such plateau is reached the eye automatically tends to shift to the center tune meter where additional slight movement of the dial causes the pointer to move to center position.

It should be noted, conversely, that the signal strength meter usefully supplements the normal function of the center tune meter. In conventional receivers the indication of the center tune meter is ambiguous. When the pointer occupies the center position, this may either indicate that a signal is being received and is in proper tune, or it may indicate that there is no signal present at all. Such ambiguity is resolved by the signal strength meter; indeed, it might be said that the ambiguity never arises since the user of the receiver, noting a positive indication on the signal strength meter, can attach immediate validity to the position of the pointer of the center tune meter. In short, the readings of the two meters, taken simultaneously, at a glance, comprise a single coordinated tuning indication. This is found to be true even in the case of untrained persons operating the receiver for the first time.

Absent the signal strength meter, the tuning of a station by the center tune meter along requires experience and interpretation, i.e., knowledge that the pointer indication is only valid where rotation of the tuning dial causes a swing of the pointer from one side of center position to the other. Using the present invention the presence of a reading on the signal strength meter establishes the validity of the null reading of the tuning meter with no necessity for further manipulation. The utility of the combined reading is further illustrated by the fact that a signal may be perfectly tuned with the loudspeakers silent.

In spite of the fact that a relatively high positive voltage on the order of 8 volts exists at the terminals of the center tune meter, returning the meter circuit to the positive bus nullifies the effect of such voltage upon the meter reading. Consequently it is not necessary to balance out the unwanted voltage by separate or adjustable means and a meter movement of relatively high sensitivity, say, one producing full scale deflection from center position upon passage of 75 microamperes, may be used.

In addition to serving as indication of the relative signal strengths of different transmitting stations, the signal strength meter provides an automatic check on the antenna and all of the circuit components located ahead of point 57 where the signal strength is sampled. When the reading is reliably high, accompanied by normal volume, at the normal setting of the gain control in the audio amplifier, the set owner has assurance that the set is operating at peak efficiency. Any drop in the average reading of the signal strength meter indicates that the installation should be checked. Where a rotating antenna is employed, the reading of the signal strength meter provides a convenient reference for adjusting orientation. Also the reading of the meter may be utilized, if desired, in the setting of the squelch threshold control where such a control is provided in the receiver.

While the invention is particularly intended for achieving the precision of tuning required in stereo reproduction, it will be apparent to one skilled in the art that the invention is not necessarily limited thereto and may be employed with considerable advantage in the tuning of a monophonic signal. Also, while it is preferred to employ meters of the moving coil or D'Arsonval type, it will be understood that the term "meter" as used in the following claims is not limited to meters of this type but includes alternative devices providing the necessary progressive and centered indication, respectively. Moreover, while it is preferred to use a ratio detector, of the type disclosed, as a discriminator, it will be understood that the term is applicable to any detector producing a direct output voltage which varies in magnitude upon departure of the signal from a precisely tuned condition.

I claim as my invention:

1. In an FM receiver the combination comprising an R.F. amplifier, a tunable oscillator, a mixer, an I.F. amplifier including a filter stage having a flat topped pass band and an amplifier stage including limiting, a ratio detector, and an audio amplifier, means including a signal strength meter, a meter amplifier having its input connected to the signal path in the I.F. amplifier following the filter stage but ahead of the limited amplifier stage, and having its output connected to the meter so that the meter provides progressive visual indication of signal strength even for relatively weak stations, means including a center tune meter connected to the output of the ratio detector for responding to the direct voltage output of the latter and providing centered visual indication that the signal is tuned to the center of the pass band of the I.F. amplifier, and shunting means associated with the signal strength meter for diverting current from the meter at high signal level.

2. In an FM receiver the combination comprising an R.F. amplifier, a tunable oscillator, a mixer, an I.F. amplifier, a ratio detector and an audio amplifier, the ratio detector including a transformer having a primary winding, bifilar secondary windings having a balanced load circuit including diodes, a resistor for coupling the primary and secondary windings, said primary winding being connected to a source of direct voltage, means including a signal strength meter coupled to the I.F. amplifier and providing progressive visual indication of the strength of the signal therein, means including a center tune meter connected to the balanced load circuit of the ratio detector and providing centered visual indication that the signal is tuned to the center of the pass band of the I.F. amplifier, said center tune meter being connected to the source of direct voltage so that the center tune meter responds only to the output voltage of the ratio detector under conditions of detuning.

References Cited

UNITED STATES PATENTS

| | | | |
|---|---|---|---|
| 2,190,435 | 2/1940 | Roberts | 334—35 |
| 2,457,016 | 12/1948 | Vilkomerson | 334—35 |

FOREIGN PATENTS 160,735   1/1955   Australia.

RICHARD MURRAY, Primary Examiner

K. W. WEINSTEIN, Assistant Examiner

U.S. Cl. X.R.

325—344; 329—111; 334—31